(12) United States Patent
Smithies

(10) Patent No.: US 7,985,275 B2
(45) Date of Patent: Jul. 26, 2011

(54) FILTER MEDIA AND DEVICES FOR HIGH TEMPERATURE FILTRATION AND METHODS

(75) Inventor: Alan Smithies, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 11/537,758

(22) Filed: Oct. 2, 2006

(65) Prior Publication Data

US 2008/0078152 A1 Apr. 3, 2008

(51) Int. Cl.
*B01D 39/14* (2006.01)
(52) U.S. Cl. ............... 55/524; 55/521; 55/DIG. 5
(58) Field of Classification Search ........ 55/524, 55/521, DIG. 5
See application file for complete search history.

(56) References Cited

U.S. PATENT DOCUMENTS

| | | | | |
|---|---|---|---|---|
| 5,230,455 A * | 7/1993 | Price | ............. | 226/88 |
| 6,149,717 A * | 11/2000 | Satyapal et al. | ............. | 96/16 |
| 6,752,847 B2 | 6/2004 | Smithies | | |
| 2003/0110745 A1* | 6/2003 | Smithies | ............. | 55/524 |
| 2003/0192294 A1* | 10/2003 | Smithies | ............. | 55/521 |
| 2004/0031252 A1* | 2/2004 | Heikamp | ............. | 55/486 |

* cited by examiner

*Primary Examiner* — Robert J Hill, Jr.
*Assistant Examiner* — Christopher P Jones
(74) *Attorney, Agent, or Firm* — Sutherland Asbill & Brennan LLP

(57) ABSTRACT

A high temperature filter medium for use in a filtering operation comprising, a nonwoven fabric substrate having a physical structure and comprising a plurality of polymeric fibers, wherein at least a portion of the plurality of polymeric fibers comprise a base polymer and at least a portion of the plurality of polymeric fibers comprise a secondary polymer, and wherein the base polymer, the secondary polymer, or both bond at least a portion of the polymeric fibers together, the nonwoven fabric substrate being capable of retaining the physical structure at a filtering temperature greater than 135° C. A method for making a filter medium being capable of retaining the physical structure at a filtering temperature greater than 135° C.

16 Claims, 2 Drawing Sheets

FILTER MEDIA AND DEVICES FOR HIGH TEMPERATURE FILTRATION AND METHODS

TECHNICAL FIELD

This invention relates to filter media and more particularly, relates to high temperature filtration products and methods of manufacturing high temperature filtration products.

BACKGROUND OF THE INVENTION

Various industries and processes, such as combustion, cement production, and asphalt production require high temperature filtration to remove undesirable particulate matter from a fluid stream or capture the fine particulate product from a fluid stream. One example of a filtration device used in such industries is a baghouse filter. Most high temperature filtration applications employ fabric filter media at operating temperatures ranging from about 135° C. to about 200° C. Traditional dust filtration materials are made from woven or nonwoven media. Newer filters, including higher surface area pleated media, are made from spunbond or other nonwoven media such as needle punched or hydro-entangled nonwoven technology, for example. Filter media capable of being used at these high temperatures include media produced from polyphenylene sulfide (PPS) (e.g., Torcon®, from Toray Fibers, Osaka, Japan or Procon®, from Inspec Fibers, Lenzing, Austria) or aramid based fibers, (e.g., NOMEX®, from Dupont, Wilmington, Del.). The chemistry of the gas stream to be filtered dictates whether PPS or aramid is used.

The filter media can be pleated to increase the effective filtering area while occupying the same or less space in a baghouse. However, conventional polymer filter media must be treated with stiffening agent resin systems to impart the necessary features to allow the media to pleat and retain its form and functionality at the desired application temperatures. For instance, PPS based filter media without stiffening resin becomes soft and loses pleat definition at the high application temperatures due to PPS's low glass transition temperature ($T_g$) of 90° C. This loss of pleat definition renders the filter nonfunctional.

Thus, stiffening resins are impregnated into filter substrates to strengthen and stabilize the filter media for use at elevated operating temperatures. The resins are impregnated into the filter media by a multi-step secondary process, wherein the filter media are immersed in a bath of resin solution and then nip squeezed to remove the excess solution prior to drying. After drying the resin, the filter media are rendered stiff.

Yet, conventional stiffening resins, epoxies, or phenols are not fully cross-linked or cured when initially dried onto the fabric. This may allow the media to re-soften during subsequent high pressure, high temperature processes, including during the filtering operation, wherein the filter media does not fully cure and re-stiffen for up to several hours. Once fully cured, the filter media is able to withstand the filtering process. However, pleat collapse or pinching can occur while the material is soft prior to curing, which can result in re-stiffening of the filter medium in a collapsed state. If such a collapse and re-stiffening occurs while the filter media is being used in a high pressure, high temperature filtration process, the collapsed filter media becomes partially or completely nonfunctional.

Previously, polyamide-imide (PAI) resins have been successfully used to render aramid filter media stiff. See U.S. Pat. No. 6,752,847, the disclosure of which is expressly incorporated herein by reference in its entirety. Though a suitably stiff high temperature filter media can be produced, resins and a complicated, multi-step process must be used, both which are expensive. The cost of the stiffening resin can become prohibitive, as the resin is the most expensive material (on a weight per unit area basis) used to make pleated filter media. Given that a pleated element usually uses 2.3 to 3 times the amount of filter media in an equivalent sized traditional filter bag, the amount and cost of the stiffening resin used becomes critical. The amount of stiffening resin required is proportional to the amount of filter media used, and therefore, the cost of the stiffening material becomes significant.

Accordingly, there is a need for a simple and economically desirable filter medium that will be pleatable and remain rigid and functional when used in high temperature filtering applications and a simple and economical method for producing the same.

SUMMARY OF THE INVENTION

One aspect of the invention provides a filter medium for use in a filtering operation comprising a nonwoven fabric substrate having a physical structure and comprising a plurality of polymeric fibers, wherein at least a portion of the plurality of polymeric fibers comprise a base polymer and at least a portion of the plurality of polymeric fibers comprise a secondary polymer. The base polymer, the secondary polymer, or both bond at least a portion of the polymeric fibers together. The nonwoven fabric substrate is capable of retaining the physical structure at a filtering temperature greater than 135° C.

Another aspect of the invention encompasses a method for making a filter medium for use in a filtering operation comprising, forming a nonwoven fabric substrate having a first density, where the nonwoven fabric substrate comprises a plurality of polymeric fibers, and wherein at least a portion of the plurality of polymeric fibers comprise a base polymer and at least a portion of the plurality of polymeric fibers comprise a secondary polymer, compressing the nonwoven fabric substrate so as to impart a second density to the nonwoven fabric substrate greater than the first density, and heating the nonwoven fabric substrate to a bonding temperature to melt at least a portion of the base polymer, at least a portion of the secondary polymer, or both. The base polymer, the secondary polymer, or both bond at least a portion of the polymeric fibers together. The nonwoven fabric substrate is capable of retaining a physical structure at a filtering temperature greater than 135° C.

Other objects, features, and advantages of this invention will be apparent from the following detailed description, drawing, and claims.

DETAILED DESCRIPTION OF THE INVENTION

Figure 1A:
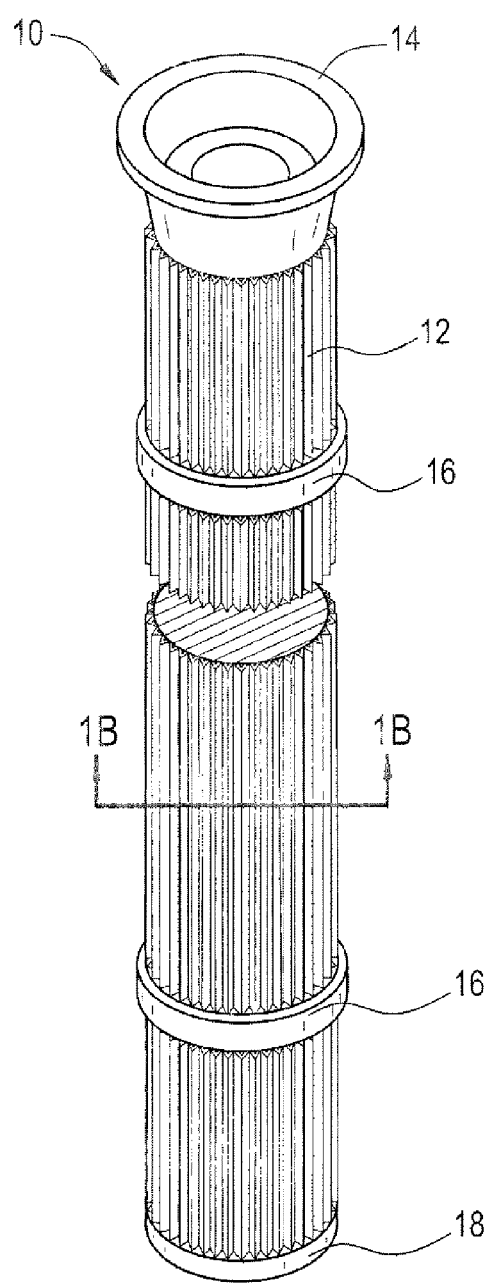
FIGS. 1A-B are a perspective view and a cross-sectional top view of a filter cartridge made in accordance with one embodiment.
Figure 1B:
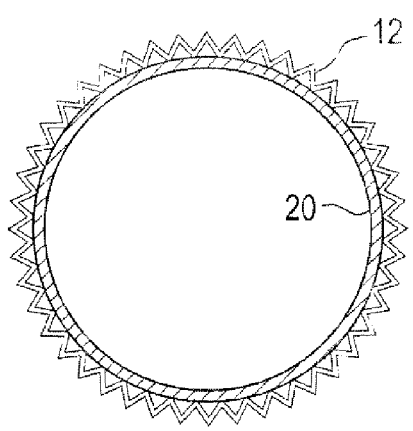

Aspects of the invention include a filter medium capable of retaining a physical structure at a filtering temperature greater than 135° C. and a method for manufacturing such a filter medium. In particular, one aspect of the present invention comprise filter media having a uniform stiffness and thermal resistivity properties which allow them to retain a physical structure during high temperature filtration. The filter media should retain structural integrity at high temperatures for extended periods of exposure and maintain the required chemical resistance and tensile strength when a fluid stream is passed through it. In addition, the filter media should have resistance to stretch or creep at elevated temperatures and be flame retardant. Aspects of the filter medium and aspects of the method of manufacturing the filter medium are described in detail below and illustrated in FIGS. 1 and 2.

A filter cartridge 10 (FIGS. 1A and 1B) includes a filter medium 12. The filter medium 12 includes a number of pleats and is positioned in the filter cartridge 10 in a generally tubular configuration. The pleats abut an inner screen 20 defining a central passageway formed within the filter cartridge 10. The filter medium 12 and inner screen 20 are aligned and held in place by an upper cap 14 and a lower cap 18. The filter cartridge is farther strengthened by retention devices 16 (e.g., fabric straps). In operation, the fluid to be filtered moves through the filter medium 12 towards the screen 20 and into the central passageway within the filter cartridge 10. Thus, particles are trapped against the outer surface of or in the filter medium 12.

Although the filter medium 12 is pleated and tubular, it should be understood that any suitable filter media cartridge and/or retention device design may be utilized. Further description of the components of the filter cartridge 10 and various uses of the filter cartridge can be found in U.S. Pat. No. 6,752,847. It should also be understood that the filtering medium 12 can be used in other filtering configurations.

The filter medium 12 includes a nonwoven fabric substrate. The nonwoven fabric substrate may comprise, but is not limited to, a carded nonwoven fabric, a needle-punched nonwoven fabric, or combinations thereof. The nonwoven fabric substrate comprises a plurality of polymeric fibers. A portion of the polymeric fibers comprises a base polymer while another portion of the polymeric fibers comprises a secondary polymer (also called a "support polymer"). For example, the nonwoven fabric substrate may comprise a plurality of base polymer staple fibers and a plurality of secondary polymer staple fibers. Alternately, the substrate may comprise bicomponent fibers, wherein one component is a base polymer and the other component is a secondary polymer. For instance, the nonwoven fabric substrate may comprise a plurality of sheath-core bicomponent fibers or side-by-side bicomponent fibers.

The base polymer may comprise any polymer suitable for use as a filter medium at filtering operation temperatures ranging from about 135° C. to about 200° C. For example, base polymers include, but are not limited to, polyphenylene sulfide (PPS) (e.g., Torcon®, from Toray, Osaka, Japan), aramid (e.g., Nomex® from Dupont, Wilmington, Del.), polyarylene sulfide, polyimide, polyamide, polyetherimide, polyamideimide, carbon, glass, or mixtures or blends thereof.

According to at least one aspect of the invention, the base polymer can bond at least a portion of the polymeric fibers together to create an interlocking nonwoven web. For instance, where the nonwoven fabric substrate comprises base polymer staple fibers and secondary polymer staple fibers, the base polymer staple fibers are dispersed within the substrate and bind the base polymer staple fibers and the secondary polymer staple fibers to each other. In other aspects wherein the nonwoven fabric substrate comprises bicomponent fibers, the base polymer can be softened or melted to bind the bicomponent fibers to each other to form a nonwoven web.

In other aspects, the base polymer does not bond the polymeric fibers together, but instead the secondary polymer binds the polymeric fibers to each other. For example, the base polymer can comprise aramid, which has no melting point, and the secondary polymer can comprise polyetherimide (PEI), which can be melted to bind the polymeric fibers to each other.

In yet other aspects, both the base polymer and the secondary polymer facilitate bonding of the polymeric fibers to each other. Controlled softening and melting of the base polymer and/or the secondary polymer to bind the plurality of polymeric fibers together and selection of base polymers and secondary polymers is discussed in greater detail below in reference to methods of manufacturing the filter medium 12.

Without being bound by theory, it is known that after exposure to a controlled temperature environment the base polymer imparts a stiffness to the filter medium 12 such that it retains its physical structure during relatively long periods of operation at elevated temperature filtration. For example, according to particular aspects of the present invention, the process of forming the filter medium 12, which will be explained in more detail below, softens or melts the base polymer to bind the polymeric fibers together and realigns the crystalline structure of the base polymer fiber to impart stiffness to the filter medium during high temperature filtration. In particular, the heat memory of the base polymer prevents it from substantially softening at its normal or specified glass transition temperature ($T_g$) and allows the filter medium 12 to retain its stiffness in high temperature operating conditions.

Thus, the base polymer in such aspects has thermal resistance properties which allow the nonwoven fabric substrate to retain its physical structure and remain functional for relatively long periods of operation at elevated temperature. An example of a suitable base polymer for use in such aspects of this invention include, but are not limited to, PPS. In other aspects, the base polymer imparts stiffness in high temperature filtration conditions without having its polymer crystallinity realigned. Examples include filter medium made in accordance with aspects of the present invention which include a base polymer comprising aramid.

According to particular aspects of the invention, the base polymer can be present in the nonwoven fabric substrate in an amount ranging from about 60% by weight of the nonwoven fabric substrate to about 80% by weight of the nonwoven fabric substrate.

The secondary polymer may comprise any polymer suitable for use in a filter medium 12 at filtering operation temperatures ranging from about 135° C. to about 200° C. This secondary polymer provides support within the filter medium 12. For example, in particular aspects, the secondary polymer is chosen to have a high glass transition temperature ($T_g$) so that the secondary polymer does not substantially soften during high temperature filtration and provides support within the filter medium 12. For instance, the $T_g$ of the secondary polymer may be greater than the operating temperature so that media made with the combination of the first and second polymers is not rendered soft at the operating temperature. Additionally, in some aspects, the secondary polymer is chosen to be insensitive to any softening of the base polymer during filtering operations at high temperatures. In a particular embodiment, Ultem® (a polyetherimide based fiber from GE Plastics, Inc., Pittsfield, Mass.), which has a $T_g$ of about 217° C., can be used as a secondary polymer in filtering applications operating at temperature from about 135° C. to about 200° C. Examples of other suitable secondary polymers for aspects of this invention include, but are not limited to, polyetherimide (PEI), polyimide, polyaramid, glass, oxidized acrylic (carbon), PPS, mixtures or blends thereof or any polymer with a $T_g$ greater than the operating temperature, or combinations thereof. In addition to providing support with the filter medium 12, the secondary polymer alone, or in combination with the base polymer, as mentioned above and described in greater detail below, may bind the polymeric fibers to each other.

The secondary polymer can be present in the nonwoven fabric substrate in an amount ranging from about 20% by weight of the nonwoven fabric substrate to about 40% by weight of the nonwoven fabric substrate. More particularly, the secondary polymer can be present in the nonwoven fabric substrate in an amount ranging from about 30% by weight of the nonwoven fabric substrate to about 40% by weight of the nonwoven fabric substrate.

Thus, the strength and stiffness imparted by the base polymer and/or the secondary polymer to the nonwoven fabric substrate allows it to retain its physical structure during filtering at the high operating temperatures. An example of such a physical structure includes, but is not limited to, a pleated structure.

The nonwoven fabric substrate can have a thickness up to about 2.00 millimeters (mm). More particularly, the nonwoven fabric substrate can have a thickness ranging from about 0.5 mm to about 1.50 mm. Still more particularly, the nonwoven fabric substrate can have a thickness ranging from about 0.5 mm to about 1.00 mm.

In addition, according to particular aspects of the invention, the nonwoven fabric substrate can have a basis weight of about 135 grams per square meter ($g/m^2$) to about 475 $g/m^2$. More particularly, the nonwoven fabric substrate can have a basis weight of about 270 $g/m^2$ to about 340 $g/m^2$. Still more particularly, the nonwoven fabric substrate can have a basis weight of about 300 $g/m^2$ to about 340 $g/m^2$. The density of the nonwoven fabric substrate should be greater than about 0.35 grams per cubic centimeter ($g/cm^3$), and a more preferred density of greater than 0.40 grams per cubic centimeter ($g/cm^3$) according to particular aspects of the invention.

According to aspects of the invention, the air permeability of the nonwoven fabric substrate can be between about 25 cubic feet per minute (cfm) and 50 cfm, the pore size of the nonwoven fabric substrate can be between about 15 microns to about 25 microns, and the denier of the polymeric fibers can be between about 1.5 denier and about 4.0 denier.

In particular aspects of this invention, the stiffness of the nonwoven fabric substrate can be between 2300 milligrams (mg) to about 4700 mg in the machine direction according to TAPPI-T543. More particularly, the stiffness of the nonwoven fabric substrate can be between 2500 mg to about 3500 mg in the machine direction according to TAPPI-T543. The stiffness of the nonwoven fabric substrate can be between 2600 mg to about 6400 mg in the cross-machine direction according to TAPPI-T543. More particularly, the stiffness of the nonwoven fabric substrate can be between 3,000 mg to about 5,000 mg in the cross-machine direction according to TAPPI-T543.

The filter medium 12 can be manufactured by forming a nonwoven fabric substrate having a first density. The nonwoven fabric substrate comprises a plurality of polymeric fibers, wherein at least a portion of the plurality of polymeric fibers comprise a base polymer and at least a portion of the plurality of polymeric fibers comprise a secondary polymer. Then the nonwoven fabric substrate is compressed so as to impart a second density to the nonwoven fabric substrate greater than the first density, and heating the nonwoven fabric substrate to a bonding temperature to melt at least a portion of the base polymer, at least a portion of the secondary polymer, or both. Thus, this method for manufacturing the filter medium 12 comprises a thermal densification process where the base polymer bonds a least a portion of the polymeric fibers together. The method imparts the stiffness to the nonwoven fabric substrate necessary to render the nonwoven fabric substrate pleatable and stiff during filtering operations at temperatures greater than 135° C.

Figure 2:
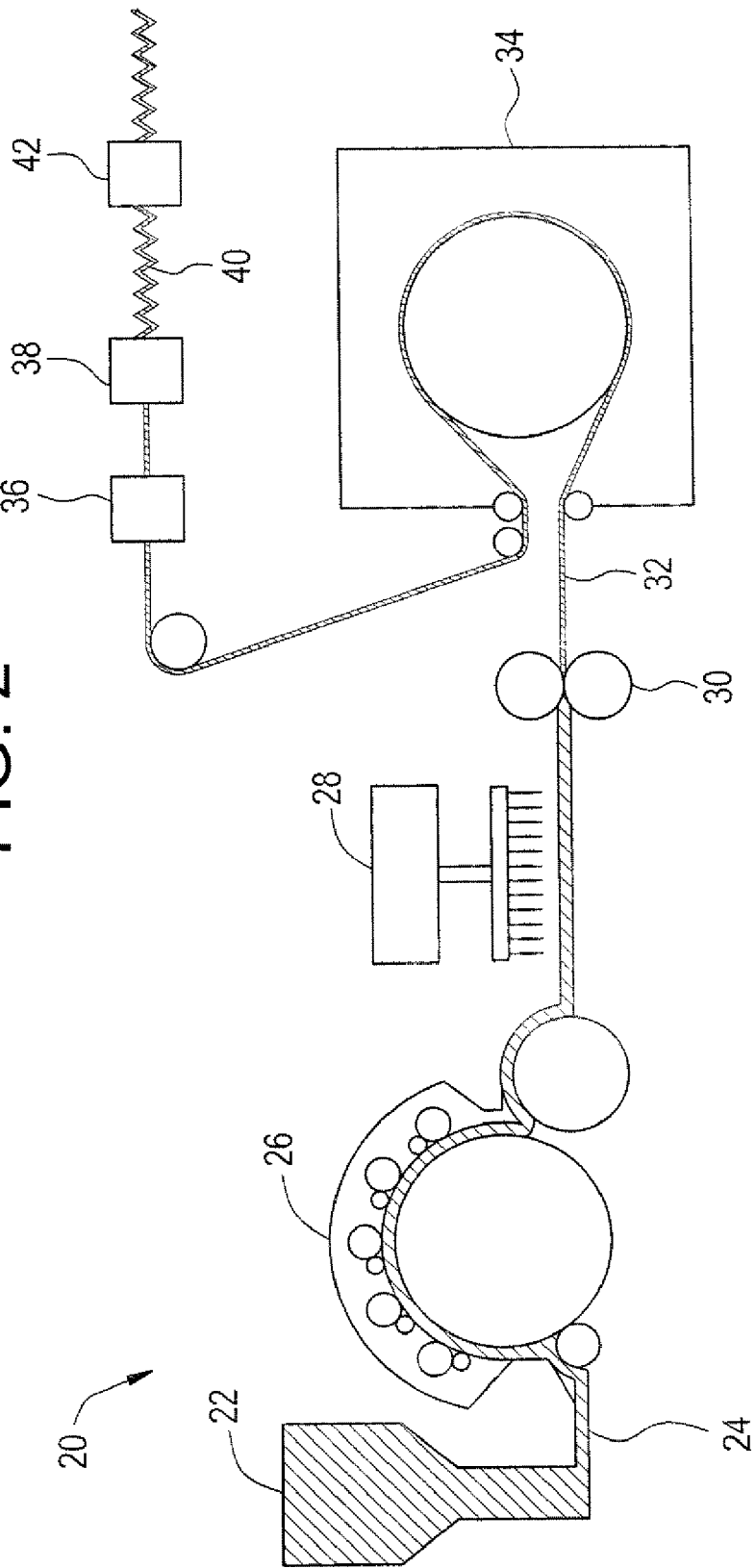
FIG. 2 is a schematic illustration of a system for use in carrying out a method of manufacturing a filter medium in accordance with one embodiment.

FIG. 2 is an illustration of a system 20 for use in carrying out a method for manufacturing a filter medium in accordance with an embodiment of the present invention. In this embodiment, the method comprises entraining a plurality of polymeric fibers in a stream of moving air within a chamber 22. A portion of the polymeric fibers comprises base polymer staple fibers and another portion of the polymeric fibers comprises secondary polymer staple fibers. It should be understood that in other aspects, the plurality of polymeric fibers could comprise other types of fibers, such as bicomponent fibers.

The polymeric fibers are then collected onto a moving forming surface 24 to form a nonwoven fibrous matt. The fibers are then carded via a carding machine 26 to form a carded web. The carded web is then needle-punched on a needle-punch machine 28 to mechanically interlock the polymeric fibers and form a needle-punched nonwoven.

Next, the needle-punched nonwoven is calendared by nip rolls 30 to produce a nonwoven fabric substrate 32. This densification imparts a thickness and density to the nonwoven fabric substrate 32 to make it suitable for use as a filter medium. Values for these properties and others are similar to those discussed above in reference to filter medium 12. As illustrated, calendaring is performed by one set of calendar rolls. It should be understood, however, that other methods known in the art may be used to densify the nonwoven fabric substrate. For example, the needle-punch nonwoven may be calendared in several consecutive calendar rolls or in an S-wrap configuration, for example. In alternate aspects, the calendar 30 may be heated to a nominal temperature. In addition, the needle-punch nonwoven may be point bonded or flat bonded by the calendar 30.

After densification, the needle-punched nonwoven is through-air bonded in an oven 34. The oven 34 may comprise any type of through-air bonding oven known in the art. Within the oven 34, hot air is drawn through the needle-punched nonwoven to soften or melt at least a portion of the base polymer, at least a portion of the secondary polymer, or both so that the polymeric fibers are bonded together. Thus, the oven temperature should be set to a temperature effective to melt at least a portion of the base polymer, at least a portion of the secondary fiber, or both. Those of ordinary skill in the art would readily acertain that the temperature and dwell time will vary with the fiber blend. For example, in an embodiment of the filter medium 12 of the present invention which comprises Ultem® secondary polymer, the oven temperature could be set between about 220° C. to about 285° C. to melt the Ultem®. According to particular aspects of the present invention, the oven temperature may be set to a temperature effective to soften or melt and realign the crystallinity of the base polymer fiber such that the resulting filter medium has a desired stiffness. For example, where the base polymer is PPS, the oven temperature can be between about 260° C. (500° F.) and about 316° C. (600° F.) to both bond the polymeric fibers and stiffen the nonwoven fabric substrate 32. Upon exiting the oven, the polymeric fibers of the nonwoven fabric substrate are bonded together and the substrate has a uniform stiffness which allows it to be used in a filter medium.

In particular, the nonwoven fabric substrate 32 can be subsequently pleated. Pleating of the nonwoven fabric substrate 32 comprises preheating the nonwoven fabric substrate in a preheat oven 36 to soften it, pleating it in a pleating machine 38 to form a pleated filter media 40, and then post-heating in a post heat oven 42. The post-heating step heats the pleated filter media 40 and applies a back pressure in the machine direction to set the pleats. In aspects where the base polymer comprises PPS and the secondary polymer comprises Ultem®, the preheat temperature can range from about 150° C. to about 250° C. while the post-heat temperature can range from about 225° C. to about 250° C.

It should be understood that the steps of this method may be carried out in sectionalized or separate manufacturing lines, even though the apparatus 20 illustrates a continuous manufacturing line.

Another aspect is further illustrated below in an example which is not to be construed in any way as imposing limitations upon the scope of this disclosure. On the contrary, it is to be clearly understood that resort may be had to various other aspects, modifications, and equivalents thereof which, after reading the description therein, may suggest themselves to those skilled in the art without departing from the scope of this disclosure and the appended claims.

EXAMPLE

In one embodiment, polymeric fibers comprising Torcon™ PPS base polymer staple fibers (from Toray, Osaka, Japan) and P84® polyimide secondary polymer staple fibers were used to form a carded web. The Torcon® was present in the carded web in an amount of about 70% by weight of the carded web. The P84® polyimide was present in the carded web in an amount of about 30% by weight of the carded web. The carded web was calendared and then through-air bonded at a temperature of 270° C. to produce a nonwoven fabric substrate which can be used as a filter medium at temperatures ranging from about 135° C. to about 200° C.

The nonwoven fabric substrate had a basis weight of 9.5 oz/yd$^2$, a permeability of about 25.6 to 36.5 cubic feet per minute, a thickness of 0.04 inches, a density of 0.32 g/cc, a machine direction stiffness of 3556 mm according to TAPPI-T543, and a cross-machine direction stiffness of 3733 mm according to TAPPI-T543.

It should be understood that the foregoing relates to particular aspects and that numerous changes may be made therein without departing from the scope of this disclosure as defined from the following claims.

I claim:

1. A filter medium for use in a high temperature filtering operation comprising, a nonwoven fabric substrate having a pleated physical structure and comprising a plurality of polymeric fibers, wherein at least a portion of the plurality of polymeric fibers comprise a base polymer and at least a portion of the plurality of polymeric fibers comprise a secondary polymer, and wherein at least a portion of the polymeric fibers are bonded together by a polymer portion selected from the group consisting of the base polymer, the secondary polymer, and combinations thereof, the nonwoven fabric substrate being capable of retaining the pleated physical structure during filtering operations at a filtering temperature up to about 200° C., and wherein the nonwoven fabric substrate has a density greater than 0.35 grams per cubic centimeter and is devoid of a stiffening resin.

2. The filter medium of claim 1, wherein the at least a portion of the plurality of polymeric fibers comprising the base polymer comprises a plurality of base polymer staple fibers, and wherein the at least a portion of the plurality of polymeric fibers comprising the secondary polymer comprises a plurality of secondary polymer staple fibers dispersed within the plurality of base polymer staple fibers.

3. The filter medium of claim 1 wherein the plurality of polymeric fibers comprise at least one bicomponent fiber, the at least one bicomponent fiber comprising the base polymer and the secondary polymer.

4. The filter medium of claim 1, wherein the base polymer comprises polyphenylene sulfide, aramid, polyarylene sulfide, polyimide, polyamide, glass, or combinations thereof.

5. The filter medium of claim 1, wherein the secondary polymer comprises polyetherimide, polyamideimide, polyimide, polyaramid, glass, oxidized acrylic (carbon), a polymer with a glass transition temperature higher than 200° C., or combinations thereof.

6. The filter medium of claim 1, wherein the base polymer is present in the nonwoven fabric substrate in an amount ranging from about 60% by weight of the nonwoven fabric substrate to about 80% by weight of the nonwoven fabric substrate.

7. The filter medium of claim 1, wherein the secondary polymer is present in the nonwoven fabric substrate in an amount ranging from about 20% by weight of the nonwoven fabric substrate to about 40% by weight of the nonwoven fabric substrate.

8. The filter medium of claim 1, wherein the nonwoven fabric substrate has a machine-direction stiffness greater than 2300 mg according to TAPPI-T543 and a cross-machine-direction stiffness greater than 2600 mg according to TAPPI-T543.

9. A filter medium of claim 1, wherein the plurality of polymeric fibers comprise a plurality of staple fibers, and wherein at least a portion of the staple fibers comprise a plurality of base polymer staple fibers and at least a portion of the staple fibers comprise a plurality of secondary polymer staple fibers dispersed within at least a portion of the plurality of base polymer staple fibers, and wherein the base polymer, the secondary polymer, or both bond at least a portion of the plurality of polymeric fibers together.

10. A filter medium for use in a filtering operation prepared by a method comprising: forming a nonwoven fabric substrate having a first density, the nonwoven fabric substrate comprising a plurality of polymeric fibers, wherein at least a portion of the plurality of polymeric fibers comprise a base polymer, and wherein at least a portion of the plurality of polymeric fibers comprise a secondary polymer; compressing the nonwoven fabric substrate so as to impart a second density to the nonwoven fabric substrate greater than the first density; heating the nonwoven fabric substrate to a bonding temperature to melt at least a portion of the base polymer, at least a portion of the secondary polymer, or both such that the base polymer, the secondary polymer, or both bond at least a portion of the polymeric fibers together; and pleating the nonwoven fabric substrate so as to impart a pleated physical structure to the nonwoven fabric substrate; wherein the filter medium is devoid of a stiffening resin and has a density greater than about 0.35 grams per cubic centimeter and is capable of retaining the pleated physical structure during the filtering operation at a filtering temperature up to about 200° C.

11. The filter medium of claim 10, wherein the at least a portion of the plurality of polymeric fibers comprising the base polymer comprises a plurality of base polymer staple fibers, and wherein the at least a portion of the plurality of polymeric fibers comprising the secondary polymer comprises a plurality of secondary polymer staple fibers dispersed within the plurality of base polymer staple fibers.

12. The filter medium of claim 10, wherein the base polymer comprises polyphenylene sulfide, aramid, polyarylene sulfide, polyimide, polyamide, glass, or combinations thereof.

13. The filter medium of claim 10, wherein the secondary polymer comprises polyetherimide, polyimide, polyamidimid, polyaramid, glass, oxidized acrylic (carbon), a polymer with a glass transition temperature higher than 200° C., or combinations thereof.

14. The filter medium of claim 10, wherein the base polymer is present in the nonwoven fabric substrate in an amount ranging from about 60% by weight of the nonwoven fabric substrate to about 80% by weight of the nonwoven fabric substrate.

15. The filter medium of claim 10, wherein the step of heating comprises passing air through the nonwoven fabric substrate, the air having a temperature greater than about 260° C.

16. The filter medium of claim 10, wherein the nonwoven fabric substrate has a machine-direction stiffness greater than 2300 mg according to TAPPI-T543 and a cross-machine-direction stiffness greater than 2600 mg according to TAPPI-T543.

* * * * *

UNITED STATES PATENT AND TRADEMARK OFFICE
CERTIFICATE OF CORRECTION

| | | |
|---|---|---|
| PATENT NO. | : 7,985,275 B2 | Page 1 of 1 |
| APPLICATION NO. | : 11/537758 | |
| DATED | : July 26, 2011 | |
| INVENTOR(S) | : Alan Smithies | |

It is certified that error appears in the above-identified patent and that said Letters Patent is hereby corrected as shown below:

On the title page, (73) Assignee, delete "General Electric Company, Schenectady, NY (US)" and insert --BHA Group, Inc., Kansas City, MO (US)--.

Signed and Sealed this
Eighteenth Day of October, 2011

David J. Kappos
*Director of the United States Patent and Trademark Office*